(12) United States Patent
Zhang et al.

(10) Patent No.: US 10,900,804 B2
(45) Date of Patent: Jan. 26, 2021

(54) METHODS AND SYSTEMS FOR ROADWORK EXTENSION IDENTIFICATION USING SPEED FUNNELS

(71) Applicant: HERE GLOBAL B.V., Eindhoven (NL)

(72) Inventors: Zhenhua Zhang, Chicago, IL (US); Leon Stenneth, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 63 days.

(21) Appl. No.: 16/217,972

(22) Filed: Dec. 12, 2018

(65) Prior Publication Data

US 2020/0191603 A1 Jun. 18, 2020

(51) Int. Cl.
*G08G 1/0962* (2006.01)
*G01C 21/36* (2006.01)
*G01C 21/30* (2006.01)

(52) U.S. Cl.
CPC ......... *G01C 21/3697* (2013.01); *G01C 21/30* (2013.01); *G01C 21/3667* (2013.01); *G08G 1/09623* (2013.01)

(58) Field of Classification Search
CPC ............... G01C 21/3697; G01C 21/30; G01C 21/3667; G08G 1/09623
See application file for complete search history.

(56) References Cited

U.S. PATENT DOCUMENTS

| | | | |
|---|---|---|---|
| 7,260,465 B2 * | 8/2007 | Waldis | B60K 31/0008 701/96 |
| 9,195,914 B2 | 11/2015 | Fairfield et al. | |
| 9,221,461 B2 | 12/2015 | Ferguson et al. | |
| 2010/0204896 A1 * | 8/2010 | Biondo | B60W 30/143 701/93 |

(Continued)

FOREIGN PATENT DOCUMENTS

| | | |
|---|---|---|
| CN | 105467392 A | 4/2016 |
| CN | 106585622 A | 4/2017 |

(Continued)

OTHER PUBLICATIONS

Iowa Dept of Safety, Office of Traffic & Safety, "Chapter 2—Signing" in Traffic and Safety Manual (2013), 1-17. (Year: 2013).*

(Continued)

*Primary Examiner* — Hunter B Lonsberry
*Assistant Examiner* — Daniel M. Robert
(74) *Attorney, Agent, or Firm* — Ditthavong & Steiner, P.C.

(57) ABSTRACT

A solution including a method, a system, and a computer program product are provided herein in accordance with at least one example embodiment for identification of at least one road work extension in a geographical location. The solution includes the process of building and accessing of a map for the geographic location curated with the marking of one or more road work zones corresponding to the at least one road work extensions. The method includes the steps of (Continued)

obtaining multiple speed funnels of a route and validating at least one speed funnel based on the sign value of a last learned speed sign of the speed funnel. The method further generates the road work extension data associated with the road work extension based on the last learned speed sign and a result.

20 Claims, 7 Drawing Sheets

(56) References Cited

U.S. PATENT DOCUMENTS

| | | | |
|---|---|---|---|
| 2014/0067256 A1* | 3/2014 | Aoki | G01C 21/30 |
| | | | 701/417 |
| 2015/0241878 A1* | 8/2015 | Crombez | B60W 30/12 |
| | | | 701/23 |
| 2015/0302747 A1 | 10/2015 | Ro | |
| 2018/0229729 A1* | 8/2018 | McQuillen | B60W 30/188 |

FOREIGN PATENT DOCUMENTS

| | | | |
|---|---|---|---|
| WO | 2011157251 A1 | 12/2011 | |
| WO | 2017144319 A1 | 8/2017 | |
| WO | WO-2017144319 A1 * | 8/2017 | ............ G06F 16/29 |

OTHER PUBLICATIONS

Anne-Sophie Puthon, Fawzi Nashashibi, Benazouz Bradai. A complete system to determine the speed limit by fusing a GIS and a camera. ITSC'11—14th International IEEE Conference on Intelligent Transportation Systems, Oct. 2011, Washington DC, United States. pp. 1686-1691, (Year: 2011).*

Fazekas et al., "Locating Roadworks Sites via Detecting Change in Lateral Positions of Traffic Signs Measured Relative to the Ego-Car", Transportation Research Procedia 27 (2017), pp. 341-348.

* cited by examiner

METHODS AND SYSTEMS FOR ROADWORK EXTENSION IDENTIFICATION USING SPEED FUNNELS

TECHNOLOGICAL FIELD

The present disclosure generally relates to navigation technology, and more particularly to a system, method and computer program of identification of roadwork extensions.

BACKGROUND

Roadwork or road reconstruction is a very inconvenient process in itself for obvious reasons. The roadwork, in an example, may include, road surface repairs, work on power lines, water works, etc. Sometimes, the roadwork causes disablement of the entire lane temporarily which may cause delays and increased travel time for travelers. Also, the roadwork zone or the lane undergoing repair may require skillful and slow drivers as the lane condition is not at its best. Roadwork zones may also be found when a major accident occurs and road debris from the accident needs to be cleared, in such cases the roadwork necessitates the motorists to take a detour via longer possible route that consumes lot of time and energy of the motorists. Hence it is useful to identify the road work zones well in advance and plan the course of drive or the speed of drive.

Presently, the roadwork zones are indicated to the motorists or autonomous vehicles using road signs, such as, "men at work" sign, "roadwork ahead" sign etc., or temporary signs such as traffic cones, barrier boards, etc. In some countries, the roadwork zones are indicated to the motorists or autonomous vehicles using lane markings from a distance of the roadwork zone and speed limit signs from a distance of the roadwork zone. However, it might not be possible to clearly identify pictorial and iconic signs when the vehicle is moving at higher speeds. Moreover, for autonomous vehicles identifying such signs well in advance may be important to avoid collisions and undue mishaps.

BRIEF SUMMARY

In the case of autonomous vehicles, there may be a requirement for transitioning from autonomous mode to manual driving mode, when the vehicle approaches a road work zone. In case of autonomous vehicles, the prior identification of the roadwork zone allows for decision time for switching from autonomous to manual well in advance. Accordingly, there is a need for an intuitive solution that is capable of detecting the road work zone and providing the detected road work zones to the motorists through a user interface.

A method, a system, and a computer program product are provided in accordance with an example embodiment described herein for determining road work extension data for identification of at least one road work extension.

Embodiments of the disclosure provide a method for determining road work extension data for identification of at least one road work extension. The method comprises the step of obtaining one or more speed funnels. Each of the one or more speed funnels include at least two learned speed signs, where the each learned speed sign is different from the other. The method further comprises the steps of validating at least one speed funnel from the one or more speed funnels, based on a sign value of a last learned speed sign of each of the one or more speed funnels and searching in one or more first links downstream of the last learned speed sign of the validated at least one speed funnel where the one or more first link includes a downstream link, to obtain a result. The result indicates either a determination of a candidate learned speed sign on the downstream link of the one or more first links or a total length of the one or more first links becoming equal to a threshold distance. The downstream link is one of a first map-matched link on which the last learned speed sign is positioned or a second link associated with the first map-matched link. Furthermore, the method comprises the step of determining the road work extension data associated with the at least one road work extension, based on the last learned speed sign and the result.

According to one embodiment of the disclosure, a sign value difference between the candidate learned speed sign and the last learned speed sign is within a non-negative threshold range.

According to one embodiment of the disclosure, the searching in the one or more first links further comprises determining the downstream link from the one or more first links.

According to one embodiment of the disclosure, the determining of the downstream link from the one or more first links comprises steps of determining one or more third links from the one or more first links based on a link criteria and selecting the second link, from the determined one or more third links, as the downstream link, where an heading difference, between the second link and a link preceding the second link in the determined by one or more third links, is within a threshold heading range.

According to one embodiment of the disclosure, the link criteria includes a first criterion that an upstream node of each of the one or more third links is same as a downstream node of a corresponding link preceding each of the one or more third links, a second criterion that a functional class of each of the one or more third links is same as a functional class of the corresponding link preceding each of the one or more third links, a third criterion that a ramp indicator of each of the one or more third links is same as a ramp indicator of the corresponding link preceding each of the one or more third links and a fourth criterion that a total length of the one or more third links is less than the threshold distance.

According to one embodiment of the disclosure, the result indicates the determination of the candidate learned speed sign on the downstream link, where the determining of the road work extension data further comprises the steps of identifying a start position of the at least one road work extension based on the last learned speed sign on the first map-matched link and identifying an end position of the at least one road work extension as a location of the candidate learned speed sign on the downstream link.

According to one embodiment of the disclosure, the downstream link is the first map-matched link and a start offset associated with the candidate learned speed sign is greater than a start offset associated with the last learned speed sign.

According to one embodiment of the disclosure, the validation of the at least one speed funnel is based on a comparison between the sign value of the last learned speed sign of each of the one or more speed funnels and a map speed value of the first map-matched link.

According to one embodiment of the disclosure, the result indicates that the total length of the one or more links is equal to the threshold distance, where the determining of the road extension data associated with the at least one road work extension comprises the steps of identifying a start position of the at least one road work extension as a location of the last learned speed sign on the first map-matched link, and identifying an end position of the at least one road work extension as a link end location of the downstream link. The downstream link corresponds to end of the one or more links in the downstream of the last learned speed sign.

According to one embodiment, the disclosure provides a system for determining road work extension data for identification of at least one road work extension. The system comprising of at least one memory configured to store computer program code instructions and at least one processor configured to execute the computer program code instructions to perform a step of obtaining one or more speed funnels. Each of the one or more speed funnels include at least two learned speed signs, where the each learned speed sign is different from the other. The at least one processor is further configured to perform the steps of validating at least one speed funnel from the one or more speed funnels, based on a sign value of a last learned speed sign of each of the one or more speed funnels and searching in one or more first links in downstream of the last learned speed sign of the validated at least one speed funnel where the one or more first link includes a downstream link, to obtain a result. The result indicates either a determination of a candidate learned speed sign on the downstream link of the one or more first links or a total length of the one or more first links is equal to a threshold distance. The downstream link is one of a first map-matched link on which the last learned speed sign is positioned or a second link associated with the first map-matched link. Furthermore, the at least one processor is configured to perform the step of determining the road work extension data associated with the at least one road work extension, based on the last learned speed sign and the result.

According to another embodiment, the disclosure provides a computer program product comprising at least one non-transitory computer-readable storage medium having stored thereon computer-executable program code instructions which when executed by a computer, cause the computer to carry out operations for determining road work extension data for identification of at least one road work extension. The operations comprising of a step of obtaining one or more speed funnels. Each of the one or more speed funnels include at least two learned speed signs, where the each learned speed sign is different from the other. The operations further comprising of the steps of validating at least one speed funnel from the one or more speed funnels, based on a sign value of a last learned speed sign of each of the one or more speed funnels and searching in one or more first links in downstream of the last learned speed sign of the validated at least one speed funnel where the one or more first link includes a downstream link, to obtain a result. The result indicates either a determination of a candidate learned speed sign on the downstream link of the one or more first links or a total length of the one or more first links is equal to a threshold distance. The downstream link is one of a first map-matched link on which the last learned speed sign is positioned or a second link associated with the first map-matched link. Furthermore, the operations comprising of the step of determining the road work extension data associated with the at least one road work extension, based on the last learned speed sign and the result.

BRIEF DESCRIPTION OF THE DRAWINGS

Figure 1:
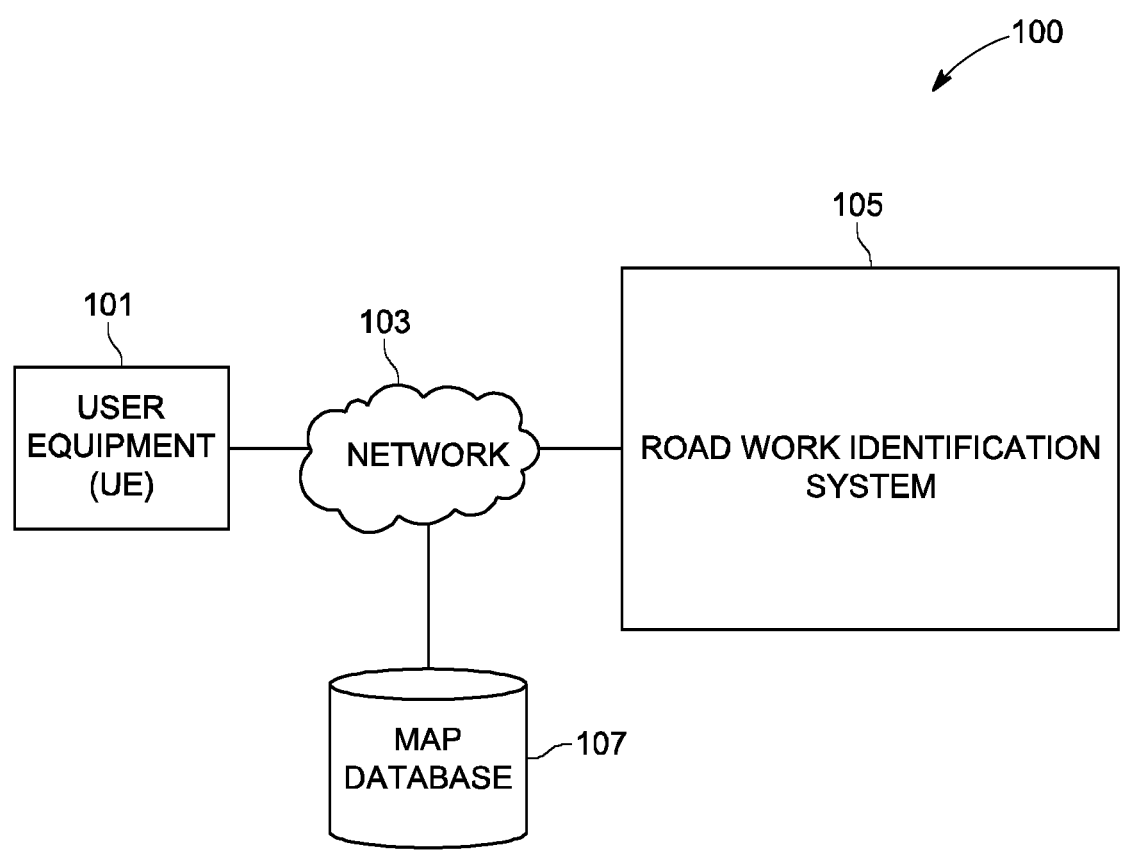
Figure 2:
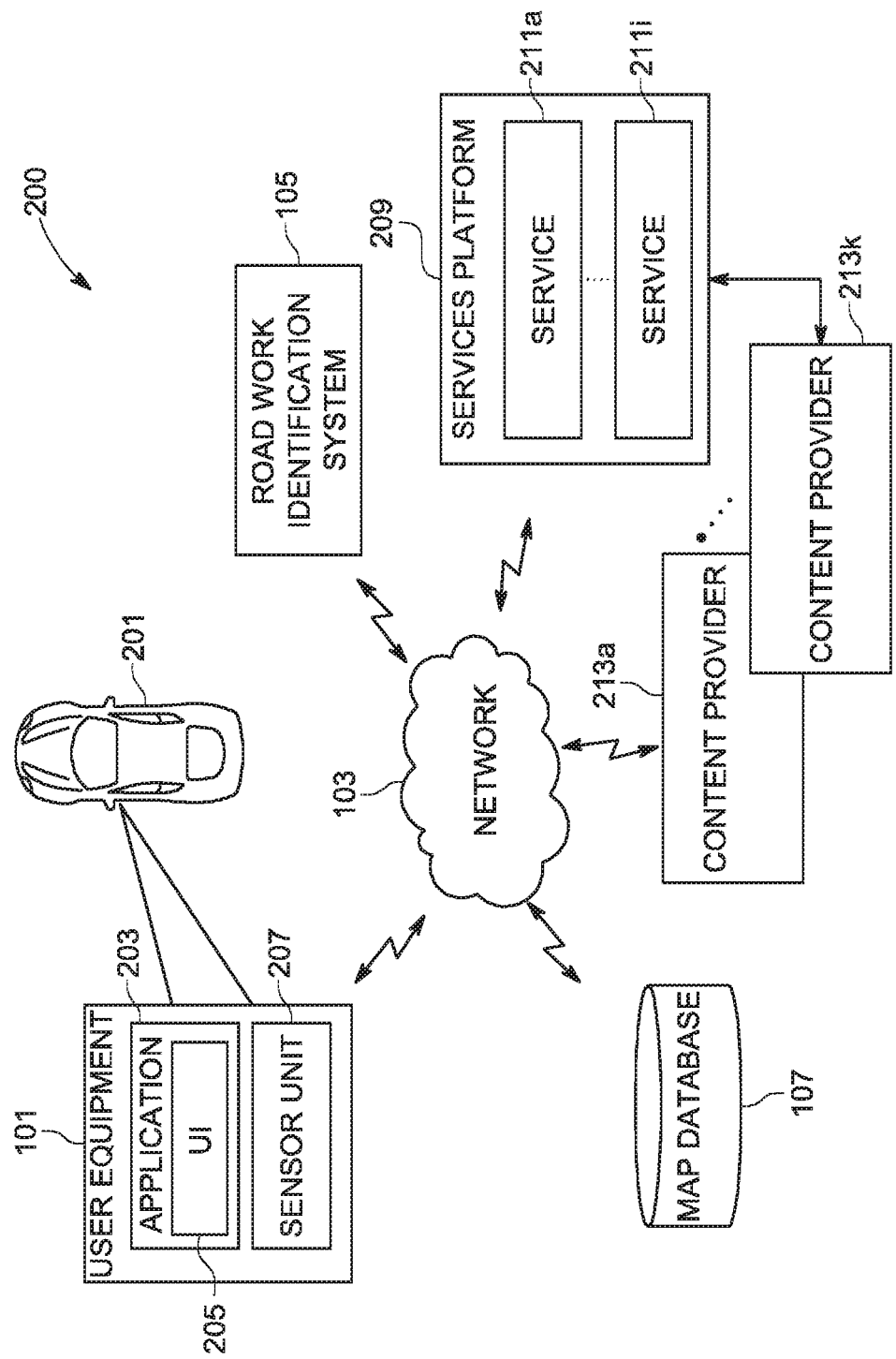
Figure 3:
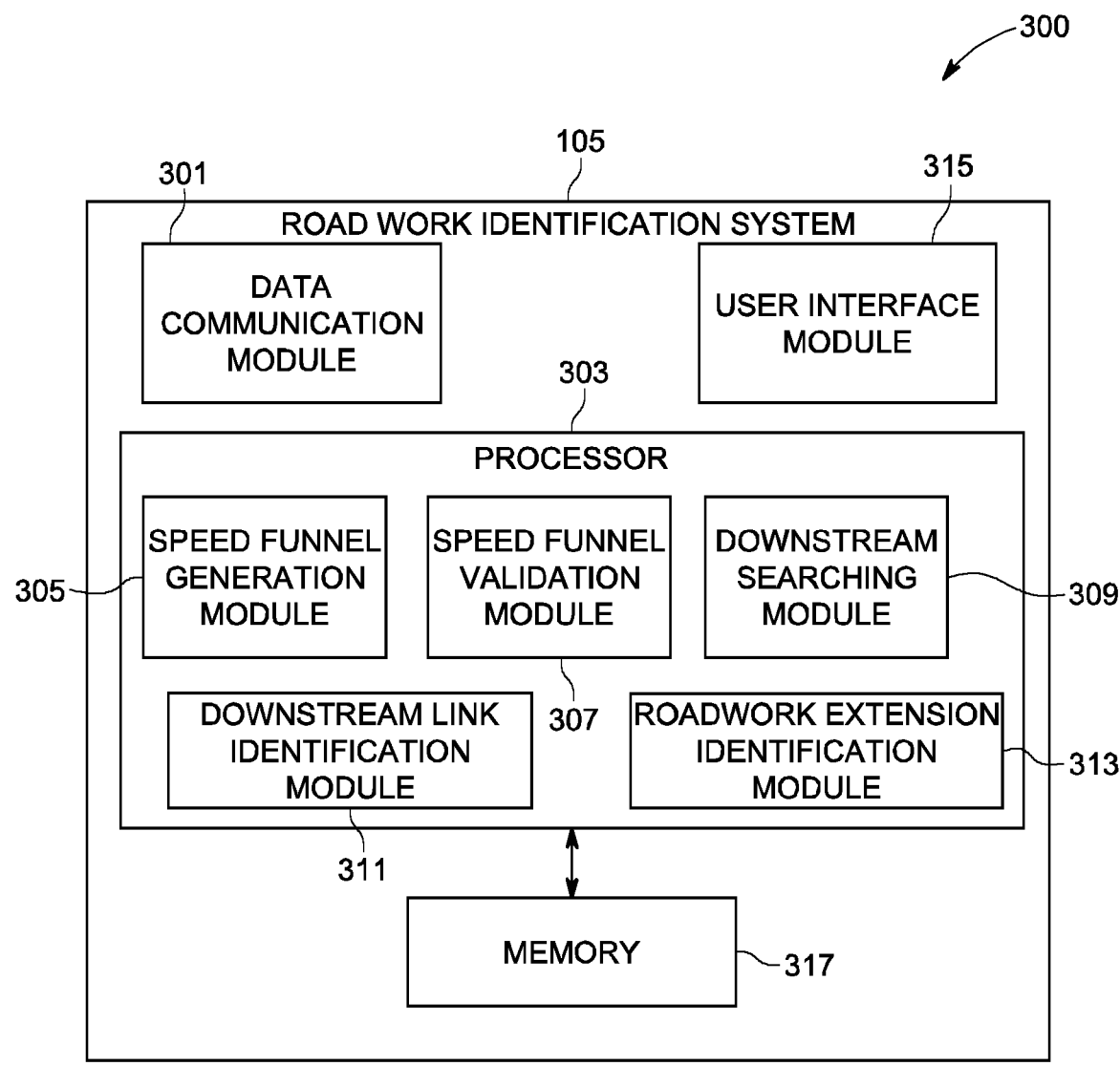
Figure 4A:
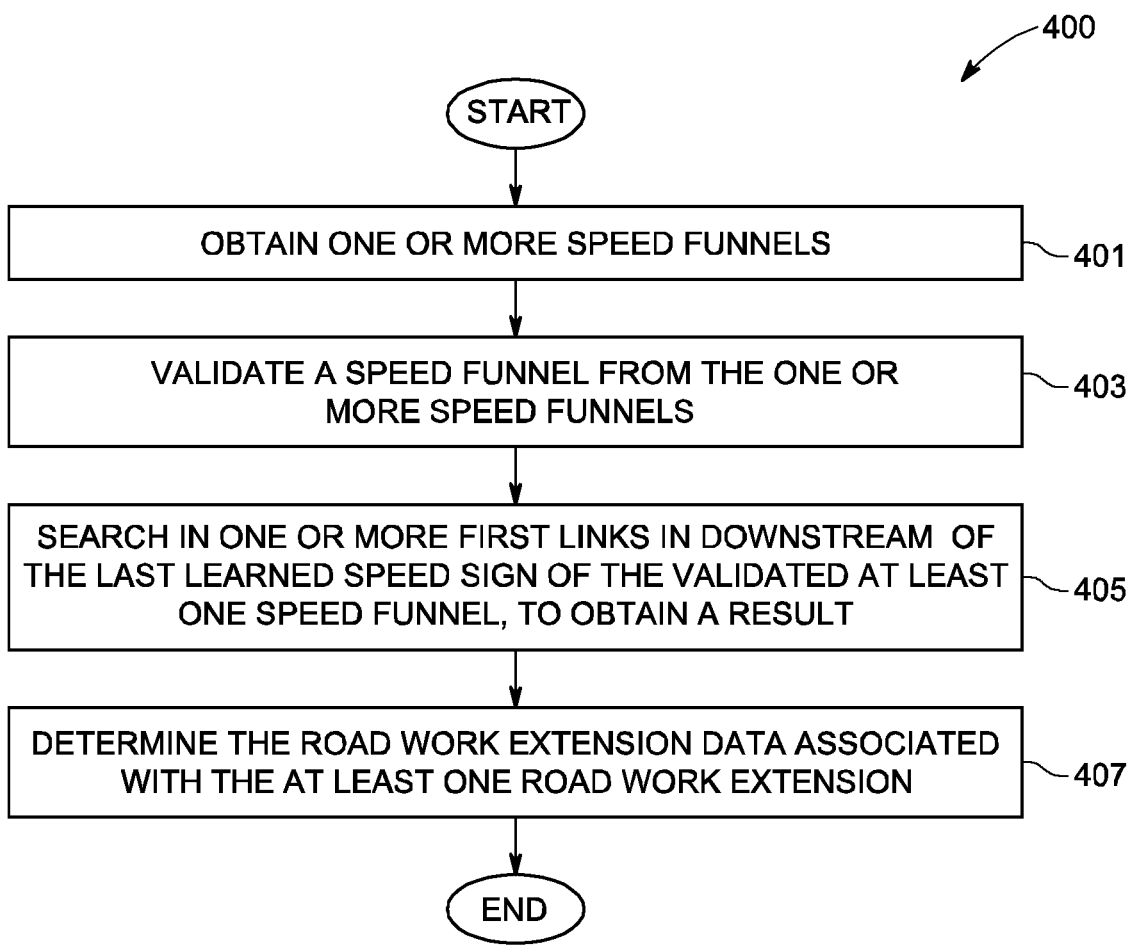
Figure 4B:
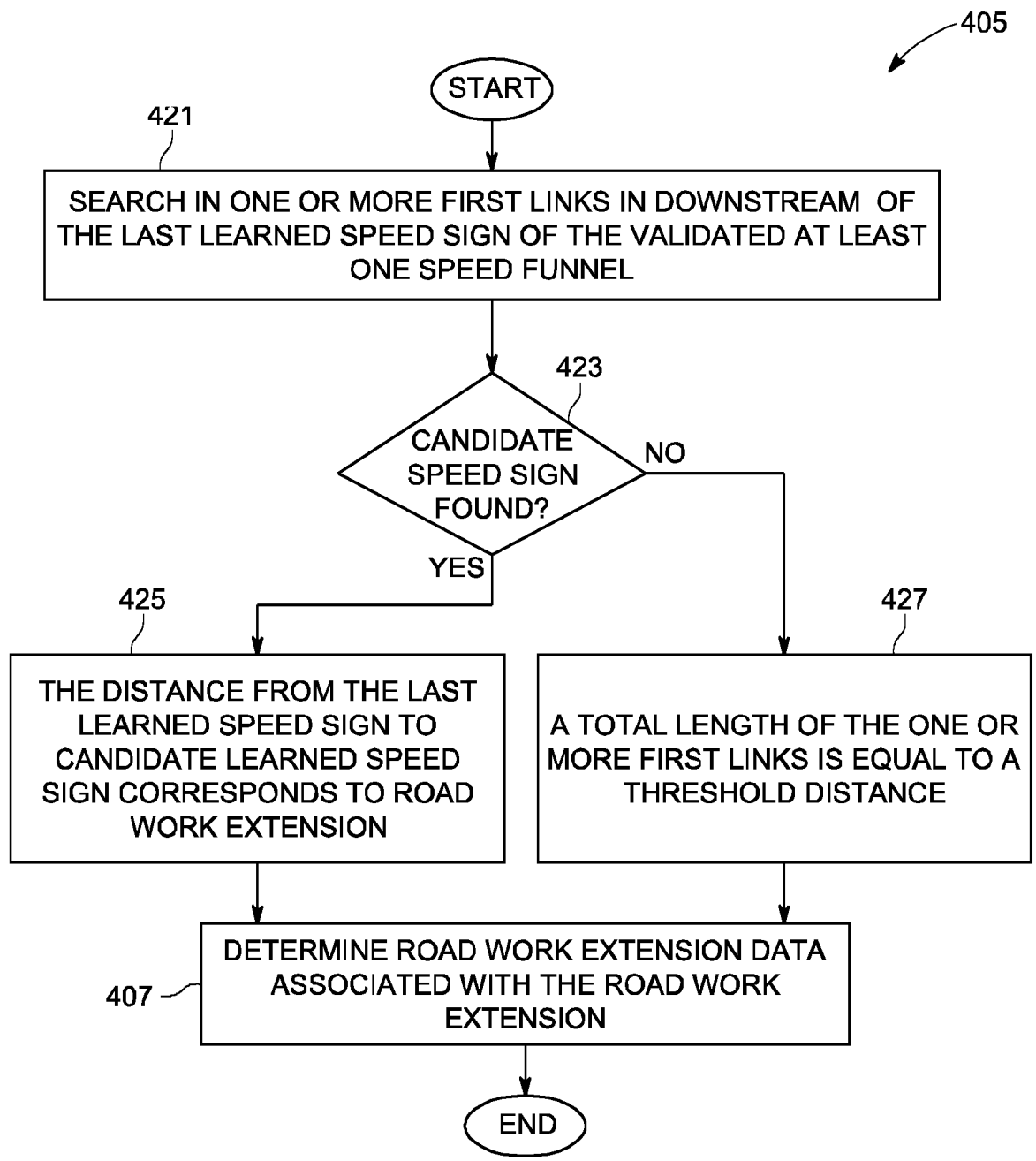
Figure 5:
Figure 6:
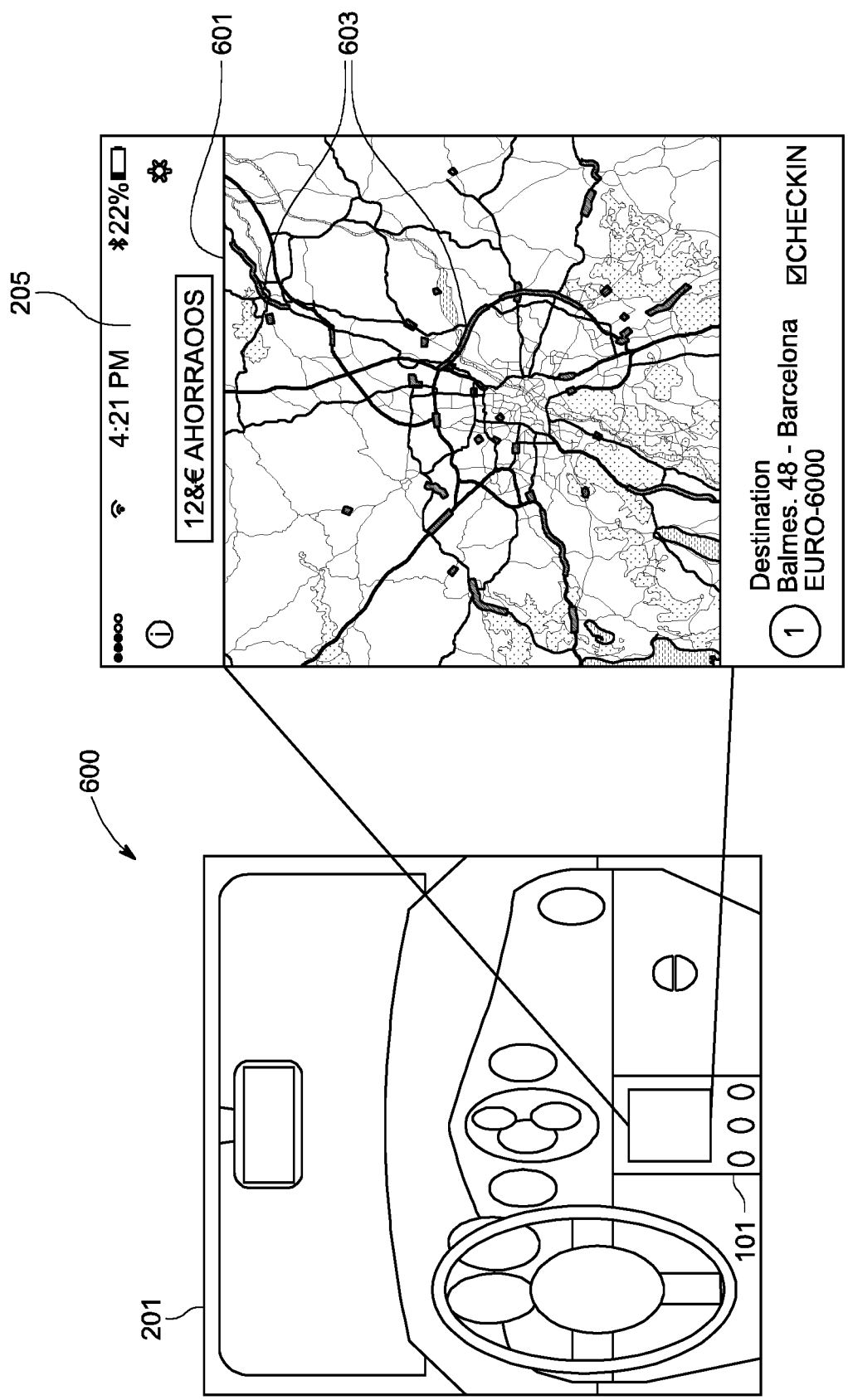

Having thus described example embodiments of the invention in general terms, reference will now be made to the accompanying drawings, which are not necessarily drawn to scale, and wherein:

FIG. 1 illustrates a schematic diagram of a system, in accordance with an example embodiment;

FIG. 2 illustrates an exemplary environment for generation of speed sign observations and processing of the observations to identify road work extensions, in accordance with an example embodiment;

FIG. 3 illustrates a block diagram of a road work identification system for determining road work extension data for identification of at least one road work extension, in accordance with an example embodiment;

FIG. 4A illustrates a flow diagram of a method for determining road work extension data for identification of at least one road work extension, in accordance with an example embodiment;

FIG. 4B illustrates a flow diagram method for determining a downstream link, in accordance with an example embodiment;

FIG. 5 illustrates a schematic diagram showing a road work extension including a speed funnel and a candidate learned speed sign, in accordance with an example embodiment; and FIG. 6 illustrates a schematic representation of a user interface representing at least one road work extension in a geographic area, in accordance with an example embodiment.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. Also, reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments. As used herein, the terms "data," "content," "information," and similar terms may be used interchangeably to refer to data capable of being displayed, transmitted, received and/or stored in accordance with embodiments of the present invention. Thus, use of any such terms should not be taken to limit the spirit and scope of embodiments of the present invention.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

Definitions

The term "link" may be used to refer to any connecting pathway with a pre-defined length. Examples of the link including, but not limited to, a roadway, a highway, a freeway, an expressway, a lane, a street path, a road, an alley, a controlled access roadway, a free access roadway and the like.

The term "learned speed sign" may be used to refer to a speed limit sign of a downstream link.

The term "speed funnel" may be used to refer to a group of two or more speed limit signs indicating a change in sign values of speed limit signs from one end of the speed funnel to the other. A speed funnel may be used as an indication for a roadwork zone, an upcoming tunnel on a pathway, or a transition from a highway to a ramp.

The term 'route' may be used to refer to a path from a source location to a destination location on any link.

End Of Definitions

A solution including a method, a system, and a computer program product are provided herein in accordance with at least one example embodiment for identification of at least one road work extension in a geographical location. The solution includes the process of building and accessing of a map for the geographic location curated with the marking of one or more road work zones corresponding to the at least one road work extensions. The system comprises at least one vehicle. In one example, the vehicle may be an automated motor such as, but not limited to, drone, auto driven car and the like; or manually operated machine such as, but not limited to, car, bus, motor bike, aerial vehicle and the like. Further, the vehicle may include a sensor unit configured to generate road sign observations, such as capturing speed signs along a route of the geographical location. The captured data is further processed to identify at least one road work extension.

The system, method and computer program product facilitating the identification of at least one road work extension (or road work extensions) is described in FIG. 1 to FIG. 6.

FIG. 1 illustrates a schematic diagram of a system 100, in accordance with at least one example embodiment. The system 100 includes a user equipment (UE) 101, which may be alternatively be referred as a user device 101. The UE 101 may be in communication with a road work identification system 105, over a network 103. The network 103 may be wired, wireless, or any combination of wired and wireless communication networks, such as cellular, Wi-Fi, internet, local area networks, communication protocols or the like.

In one example, the user equipment 101 may be at least one of a mobile computing device such as a laptop computer, tablet computer, mobile phone, smart phone, navigation unit, personal data assistant, watch, camera, or the like. Additionally or alternatively, the user equipment 101 may be a fixed computing device, such as a personal computer, computer workstation, kiosk, office terminal computer or system, or the like. In one embodiment, the user equipment 101 may be a part of a vehicle or be the vehicle itself and may be configured to provide navigation assistance functions to the user of a vehicle. In some embodiments, the user equipment 101 may be installed in the vehicle and in a preferred embodiment, the sensor unit may be configured within the UE 101 and is adapted to capture road signs along routes of a geographic location. In one example, the sensor unit may include one or more sensors for generating the road sign observations, for example, the sensor unit may include an image capturing device, such as a camera for capturing the road signs, for example speed limit signs. The user equipment 101 generates road sign observations by curating the data captured by the sensor unit. In one example, the road signs may be static road signs or variable road signs positioned along the routes. Sign values of variable road signs may vary based on traffic conditions in the vicinity of the variable road signs. For example, the variable road signs may be displayed on, LCD display panels, LED panels, etc. positioned along the road. Also, in another example, the user equipment 101 may be accessible to the road work identification system 105 through, the network 103, such that the user equipment 101 may provide navigational assistance to the user among other services.

As exemplarily illustrated, the system 100 may also include a map database 107, which may store node data, road segment data or link data, point of interest (POI) data, posted signs related data or the like. The map database 107 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, for example, cars, trucks, buses, motorcycles, and/or other entities. Optionally, the map database 107 may contain path segment and node data records or other data that may represent pedestrian paths or areas in addition to or instead of the vehicle road record data, for example. The road/link segments and nodes may be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 107 may include data about the POIs and their respective locations in the POI records. The map database 107 may additionally include data about places, such as cities, towns, or other communities, and other geographic features such as bodies of water, mountain ranges, etc. Such place or feature data may be part of the POI data or may be associated with POIs or POI data records (such as a data point used for displaying or representing a position of a city). In addition, the map database 107 may include event data (e.g., traffic incidents, construction activities, scheduled events, unscheduled events, etc.) associated with the POI data records or other records of the map database 107 associated with the road work identification system 105. The map database 107 may additionally include data related to roadwork zones, such as, location of the roadwork zones, diversions to be caused due to the roadwork zones, suggested routes to avoid congestion to be caused due to the roadwork zones, etc. The data related roadwork zones may be fetched by the system 100 from external systems, such as, roadwork planning system of the municipalities.

In some embodiments, the map database may be part of a mapping platform that may be configured to provide a repository of algorithms for implementing a plurality of location-based services for navigation systems. For example, the mapping platform may include algorithms related to geocoding, routing (multimodal, intermodal, and unimodal), clustering algorithms, machine learning in location based solutions, natural language processing algorithms, artificial intelligence algorithms, and the like. The data for different modules of the mapping platform may be collected using a plurality of technologies including but not limited to drones, sensors, connected cars, cameras, probes, chipsets and the like. As noted above, the mapping platform including the map database 105 may be embodied by the processing component. However, in some embodiments, the mapping platform may be embodied as a chip or chip set. In other words, the mapping platform may comprise one or more physical packages (for example, chips) including materials, components and/or wires on a structural assembly (for example, a baseboard). The structural assembly may provide physical strength, conservation of size, and/or limitation of electrical interaction for component circuitry included thereon. The mapping platform may therefore, in some cases, be configured to implement an example embodiment of the present invention on a single "system on a chip." As such, in some cases, a chip or chipset may constitute a means for performing one or more operations for providing the functionalities described herein.

Further, the road work identification system 105 is configured to receive road sign observations and process the observations to identify at least one road work zone (or a road work zone) corresponding to at least one road work extension (or a road work extension). Additionally or alternatively, geo-coordinates of the location of the road work zone are fetched from the map database 107. In one embodiment, the data captured by the sensor unit, which is configured within the user equipment 101 and/or the vehicle, may be curated into road sign observations and transmitted to an Original Equipment Manufacturer (OEM) cloud sequentially. In another example, the road sign observations may be scheduled to be transmitted to the OEM cloud in batches. In such scenarios, the roadwork identification system 105 may fetch the road sign observations from the OEM cloud itself.

In one embodiment, a content provider such as a map developer may maintain the map database 107. By way of example, the map developer may collect geographic data to generate and enhance the map database 107. There may be different ways used by the map developer to collect data. These ways may include obtaining data from other sources, such as municipalities or respective geographic authorities. In addition, the map developer may employ field personnel to travel by vehicle along roads throughout the geographic region to observe features and/or record information about them, for example. Crowdsourcing of geographic map data may also be employed to generate, substantiate, or update map data. For example, sensor data from a plurality of data probes, which may be, for example, vehicles traveling along a road network or within a venue, may be gathered and fused to infer an accurate map of an environment in which the data probes are moving. Such sensor data may be updated in real time such as on an hourly basis, to provide accurate and up to date map data. The sensor data may be from any sensor that may inform a map database of features within an environment that are appropriate for mapping. For example, motion sensors, inertia sensors, image capture sensors, proximity sensors, LIDAR (light detection and ranging) sensors, ultrasonic sensors etc. The gathering of large quantities of crowd-sourced data may facilitate the accurate modeling and mapping of an environment, whether it is a road segment or the interior of a multi-level parking structure. Also, remote sensing, such as aerial or satellite photography, may be used to generate map geometries directly or through machine learning as described herein.

The map database 107 may be a master map database stored in a format that facilitates updating, maintenance, and development. For example, the master map database or data in the master map database may be in an Oracle spatial format or other spatial format, such as for development or production purposes. The Oracle spatial format or development/production database may be compiled into a delivery format, such as a geographic data files (GDF) format. The data in the production and/or delivery formats may be compiled or further compiled to form geographic database products or databases, which may be used in end user navigation devices or systems.

For example, geographic data may be compiled (such as into a platform specification format (PSF)) to organize and/or configure the data for performing navigation-related functions and/or services, such as route calculation, route guidance, map display, speed calculation, distance and travel time functions, and other functions, by a navigation device, such as the user equipment 101. The navigation-related functions may correspond to vehicle navigation, pedestrian navigation, navigation to a favored parking spot or other types of navigation. While example embodiments described herein generally relate to vehicular travel and parking along roads, example embodiments may be implemented for bicycle travel along bike paths and bike rack/parking availability, boat travel along maritime navigational routes including dock or boat slip availability, etc. The compilation to produce the end user databases may be performed by a party or entity separate from the map developer. For example, a customer of the map developer, such as a navigation device developer or other end user device developer, may perform compilation on a received map database in a delivery format to produce one or more compiled navigation databases.

In some embodiments, the map database 107 may be a master geographic database configured at road work identification system 105, but in alternate embodiments, a client-side map database 107 may represent a compiled navigation database that may be used in or with end user devices (e.g., user equipment 101) to provide navigation, speed adjustment and/or map-related functions to navigate through road-work zones. The road work identification system 105 may cluster the road sign observations to generate learned road signs that are map-matched on links of a map developed by the map developer.

In one embodiment, from the learned road signs, the road work identification system 105 may generate speed funnels as disclosed in the detailed description of FIG. 3. Furthermore, the road work identification system 105 may search in downstream links from a last learned speed sign of at least one speed funnel to identify a candidate learned speed sign in the downstream links. The result will provide at least one road work extension data, which is described in conjunction with FIG. 3 and FIG. 4. The road work identification system 105 generates a map curated with one or more road work extensions marked. The curated map may be stored in the map database 107, where the map database 107 may be used with the end user device, such as the user equipment 101, to provide the user with navigation features and identify the road work zones corresponding to road work extensions in advance. In one example, the map database 107 may be downloaded or stored on the user equipment 101 which may access the road work identification system 105 through a wireless or wired connection, over the network 103.

In one embodiment, the user device or the user equipment 101 may be an in-vehicle navigation system, such as, an infotainment system, a personal navigation device (PND), a portable navigation device, a cellular telephone, a smart phone, a personal digital assistant (PDA), a watch, a camera, a computer, a workstation, and/or other device that may perform navigation-related functions, such as digital routing and map display. An end user may use the user equipment 101 for navigation and map functions such as guidance and map display, for example, and for determination of one or more personalized routes or route segments based on one or more calculated and recorded routes, according to some example embodiments. In some embodiments, the user of the vehicle may be notified by the road work identification system 105 about location of the roadwork zones and the user may use the user equipment 101, for example, the in-vehicle navigation system for navigation and map functions such as guidance and map display, according to some example embodiments. The user equipment 101 may include an application, for example, a mapping application with a user interface that may enable the user to access the road work identification system 105 for availing the functions disclosed above, such as, for navigating through identified roadwork zones on generating at least one route speed funnel.

An exemplary embodiment illustrating the process of generation of speed sign observations and processing of the observations to identify road work extensions is described next in FIG. 2.

FIG. 2 exemplarily illustrates a working environment 200 for generation of speed sign observations and processing of the observations to identify road work extensions, in accordance with an exemplary embodiment. A vehicle 201 may be configured to navigate along at least route (which may be simply referred as a route) of a geographical area. In one example, the vehicle 201 may be a user driven vehicle or an autonomous vehicle. An autonomous vehicle, as used throughout this disclosure, may refer to a vehicle having autonomous driving capabilities at least in some conditions. For example, the autonomous vehicle may exhibit autonomous driving on streets and roads having physical dividers between driving lanes.

In an example, the vehicle 201 may navigate through the route that includes a road work zone. In one example, the length of the road work zone may be referred to as the road work extension. The environment 200 indicates the presence of a user equipment such as the user equipment 101, associated with the vehicle 201. The user equipment 101 includes an application 203 with a user interface 205 for accessing one or more map and navigation related functions. Although one vehicle 201 is depicted in FIG. 2, it may be contemplated that the roadwork identification system 105 may operate with multiple vehicles in tandem. As such, while one or more such vehicles as vehicle 201 may capture road sign observations, one or more other vehicles may utilize the road work identification data generated by the road work identification system 105 to provide navigation assistance and related functions. For the purpose of this disclosure, both kind of functionalities of the vehicles may be discussed with reference to the vehicle 201. However, it may be contemplated that both kind of functionalities may be executable by separate vehicles in the manner as discussed above.

The user equipment 101 may include a sensor unit 207, such as a camera, an acceleration sensor, a gyroscopic sensor, a LIDAR sensor, a proximity sensor, a motion sensor and the like. In one example, the sensor unit 207 may primarily be used for detecting road signs and determining positioning of the vehicle 201. The sensor unit 207 may be built-in or embedded into or within interior of the user equipment 101. In one example, the user equipment 101 may be a part of the vehicle 201, where the UE 101 is communicatively coupled to the vehicle 201. In an alternative embodiment, the sensor unit 207 may be built-in or embedded into or within the vehicle 201, which is communicatively coupled to the user equipment 101. In some example embodiments the user equipment 101 may correspond to the vehicle 201 itself.

Further, in some embodiments, the user equipment 101 may use communication signals for position determination. The user equipment 101 may receive location data from a positioning system, a Global Navigation Satellite System, such as Global Positioning System (GPS), Galileo, GLONASS, BeiDou, etc., cellular tower location methods, access point communication fingerprinting such as Wi-Fi or Bluetooth based radio maps, or the like. In some embodiments, the vehicle 201 may have sensors positioned on or within and the sensors may provide data indicating a location of the vehicle 201, heading data associated with road signs, sign types of the road signs, sign values of the road signs along pathways approaching a roadwork zone, and any other kinds of lane markings indicating a roadwork zone that is approaching. In one example, the data collected by the sensor unit 207 may be transmitted to the OEM cloud.

Further, vehicle data, which may also be referred to as "probe data", may be collected by any device capable of determining the necessary information, and providing the necessary information to a remote entity, such as the road work identification system 105. The user equipment 101 is one example of a device that may function as a probe to collect probe data of the vehicle 201. More specifically, probe data collected by the user equipment 101 may be representative of the location of a vehicle 201 at a respective point in time and may be collected while a vehicle 201 is traveling along the route. While probe data is described herein as being vehicle probe data, example embodiments may be implemented with pedestrian probe data, marine vehicle probe data, or non-motorized vehicle probe data (e.g., from bicycles, skate boards, horseback, etc.). According to the example embodiment described below with the probe data being from motorized vehicles traveling along the route, the probe data may include, without limitation, location data, (e.g. a latitudinal, longitudinal position, and/or height, GNSS coordinates, proximity readings associated with a radio frequency identification (RFID) tag, or the like), rate of travel, (e.g. speed), direction of travel, (e.g. heading, cardinal direction, or the like), device identifier, (e.g. vehicle identifier, user identifier, or the like), a time stamp associated with the data collection, or the like. The user equipment 101, may be any device capable of collecting the aforementioned probe data.

In one example, using the sensor data from the user equipment 101, the road work identification system 105 may generate at least one route speed funnel. The sensor data generated by the sensor unit 207 may constitute road sign observations. That is, the sensor unit 207 installed in the vehicle or the user equipment may capture road signs along the route and capture the location of the road sign, type of the road sign, value of the road sign, heading at the location of the road sign, and time stamp associated with the time of capture of the road sign. The captured location of the road sign, type of the road sign, value of the road sign, heading at the location of the road sign, and time stamp associated with the capture of the road sign constitute the road sign observations. The processing of the road sign observations to generate learned road signs and processing of the learned road signs to generate at least one route speed funnel is performed by a processor configured within the road work identification system 105. In some example embodiments, the vehicle 201 may itself generate the at least one speed funnel and the road work identification system 105 may obtain the at least one speed funnel from the vehicle 201 itself. In some example embodiments, the at least one speed funnel may be generated in the OEM cloud and the road work identification system 105 may obtain the at least one speed funnel from the OEM cloud.

A services platform 209 may provide navigation related functions and services 211a-211i to the application 203 running on the user equipment 101. The services 211a-211i may include such as navigation functions, speed adjustment functions, traffic related updates, weather related updates, warnings and alerts, parking related services, indoor mapping services and the like. The services 211a-211i may be provided by a plurality of content providers 213a-213k. In some examples, the content providers 213a-213k may access various SDKs from the services platform 209 for implementing one or more services. In an example, the services platform 209 and the road work identification system 105 may be integrated into a single platform to provide a suite of mapping and navigation related applications for OEM devices, such as the user equipment 101. The user equipment 101 may be configured to interface with the services platform 209, the content provider's services 213a-213k, and the road work identification system 105 over a network 103. Thus, the road work identification system 105 and the services platform 209 may enable provision of cloud-based services for the user equipment 101, such as, storing the road sign observations in the OEM cloud in batches or in real-time and retrieving the stored road sign observations for generating at least one route speed funnel.

FIG. 3 illustrates a block diagram 300 of a road work identification system 105, (which may be alternatively referred to as the system 105) is configured to determine road work extension data for identification of at least one road work extension, in accordance with an example embodiment of the present invention. The system 105 may comprise at least one memory 317 (or a memory 317) configured to store computer program code instructions and at least one processor 303 (or a processor 303) configured to execute the computer program code instructions. Additionally, the system 105 may be further configured with a data communication module 301 and a user interface module 315.

In the embodiments described herein, the processor 303 is further configured to execute the stored computer program code instructions fetched from at least one of a speed funnel generation module 305, a speed funnel validation module 307, a downstream searching 309, a downstream link identification module 311 and a road work extension determination module 313. It may be contemplated that fewer or greater number of modules may be utilized within the scope of this disclosure to execute the various functionalities described herein.

In one embodiment, the data communication module 301 communicates with the sensor unit 207 disclosed in the detailed description of FIG. 2 and may receive the sensor data and the road sign observations from the sensor unit 207. In an alternative embodiment, the data communication module 301 may receive the road sign observations from the OEM cloud over the network 103. In some example embodiments, the data communication module 301 may also receive destination information of a user of the vehicle 201 via the network 103. The road sign observations comprise time of capture of the road sign from the vehicle 201 as a time stamp associated with each of the road sign observations. A plurality of vehicles, such as, 201 passing by the location of each of the road signs on the pathway, generate a plurality of road sign observations for each of the road signs. Thus, each road sign observation is different from other road sign observation based on location data, heading data, road sign value, and road sign type, and time of capture of the road sign from a vehicle. The data communication module 301 may receive sensor data configured to describe a position of the user equipment 101 installed in the vehicle 201, or a controller of the user equipment 101 may receive the sensor data from the positioning system of the user equipment 101. The location of the road sign is the location of capture of the road sign from vehicles, such as, 201 and the location of the road sign constitutes the location data in a road sign observation.

The processor 303 in association with the speed funnel generation module 305 is configured to generate learned speed signs from the obtained road sign observations. In one example, the sensor data from the different sensors installed in the user equipment 101 or the vehicle 201 may be converted to units and ranges compatible with the road work identification system 105, to accurately generate learned speed signs that are map-matched to links on the road. The learned speed sign comprises speed limit signs installed across a route. In some example embodiments, the speed funnel generation module 305 may generate a plurality of learned speed signs from a plurality of road speed sign observations captured by the plurality of vehicles, such as, the vehicle 201. The speed funnel generation module 305 is further adapted to analyze the learned speed signs and generate speed funnels for the route of a geographical area. In one example, each of the speed funnels may be configured with at least two learned speed signs, where every learned speed sign constituting the speed funnel is different from each other, (hereinafter referred to as different learned speed signs). The leaned speed signs constituting the speed funnel are either in the order of increasing speed limits or decreasing speed limits. For example, consider a pathway of length of 100 km. The first link of the pathway, which may extend for a length of 20 km, may have a speed limit of 60 km/h, the next link may have a speed limit of 80 km/h and the adjacent link may have a speed limit of 100 km/h. A speed funnel may this thus be formed from the above-mentioned speed signs.

In an alternate embodiment, the data communication module 301 may receive data of one or more speed funnels of a route or a pathway directly from a pre-stored source such as the OEM cloud or the vehicle(s) 201 itself.

The available one or more speed funnels are validated by the processor 303 in association with the speed funnel validation module 307 to filter out irrelevant speed funnels. For example, not all speed funnels may correspond to road work zones, a few may be from lane mergers, curved roads etc. The validation module 307 may be configured to identify a last learned speed sign of a speed funnel of the at least one speed funnel. In some example embodiments the speed funnel validation module may determine the speed value difference between the last learned speed sign and a map-matched speed of the link associated with the last learned speed sign. The map-matched speed of the link may be defined as the speed limit of the link as recorded in the map data obtained from the map database 107 of FIG. 1. If the speed value difference between the last learned speed sign of a speed funnel and a map-matched speed of the link is more than a pre-defined threshold, the speed funnel validation module 307 outputs the speed funnel as validated. In some example embodiments, the pre-defined speed limit may be 19 km/h. For example, considering the last learned speed sign having 60 km/h as the speed sign value, the processor 303 is configured to consider the speed funnel if the map-matched speed is 80 km/h. Accordingly, the processor 303 may ignore the speed funnel if map-matched speed is 75 km/h. In one example, the last learned speed sign may be considered to be located on a first map-matched link.

Further, the processor 303, in association with the downstream searching module 309, is configured to search in one or more first links which are in downstream direction of the last learned speed sign. In one example, each link of one or more first links may be alternatively referred as first link. In doing so, the processor 303 fetches the last learned speed sign location and searches in the one or more first links in the downstream of the last learned speed sign of the speed funnel to obtain a candidate learned speed sign as a result. In one example, the candidate learned speed sign may be on a link termed as downstream link which may be one among the one or more first links. The candidate learned speed sign may be defined as a learned speed sign with a speed sign value higher than that of the last learned speed sign of the validated speed funnel. In the order of priority, the processor 303 in association with the downstream link identification module 311 is configured to search for the downstream link and correspondingly identify the candidate learned speed sign located on the downstream link. Accordingly, in one embodiment, the downstream link may be the first map-matched link on which the last learned speed sign is or in another example, the downstream link may be any second link that is associated with the first map-matched link but distinct from it. For example, the second link may be any link that branches from the first map-matched link. It may be understood that the candidate learned speed sign may either be found on the first map-matched link itself or on any second link that is in further downstream of the first map-matched link. The process of finding the candidate learned speed sign in each of the cases is different and is discussed next in subsequent portions of the disclosure. The process of finding the candidate learned speed sign may encompass searching for the downstream link in the one or more first links.

In some example embodiments, the process of searching for the downstream link may include identification of one or more third links (or third links) from the one or more first links. In one example, the identification of the third links is carried out based on a link criteria. The link criteria to identify the third links may include a first criterion, a second criterion, a third criterion and a fourth criterion. The first criterion requires that an upstream node of each of the one or more third links is same as a downstream node of a corresponding link preceding the respective one of the one or more third links. In one example, the node may be a point where two links meet. The second criterion requires that a functional class of each of the third links is same as a functional class of the corresponding link preceding the respective one of the one or more third links. In one example, the functional class may be defined as the type of the link or a classifier of the link. The third criterion requires that a ramp indicator of each of the third links is same as a ramp indicator of the corresponding link preceding the respective one of the one or more third links. The ramp indicator may indicate the heading deviation of a branching link with respect to the parent link. The fourth criterion describes that a total length of the third links is less than a threshold distance. In a preferred embodiment, the threshold distance may be 15 km. However, any suitable distance may be chosen as the threshold distance. The link(s) that satisfies above conditions of the link criterion may be considered as the one or more third links.

The downstream link identification module 311 is further configured to identify the second link from the one or more third links. In one example, more than one link may satisfy the aforesaid link criteria. However, to be chosen as the second link, the link with smallest heading difference is chosen as the second link. That is the heading difference between the chosen second link and the link preceding the second link should be within a threshold heading range. The link that meets all the above criteria may be considered as the second link. Next if the speed sign value difference between the speed sign of the second link and the speed sign value of the last speed sign of the validated speed funnel is within a non-negative threshold range, the second link is considered as the downstream link and the speed sign associated with this second link is taken as the candidate learned speed sign. For example, the non-negative threshold range may be considered to be greater than zero and less than 30 Km/h. The process of searching in the one or more first links may thus end if the candidate learned speed sign is found (either on the first map matched link or on the second link).

The processor 303 furthermore, in association with the road work extension identification module 313 may be configured to identify the road work extension. The identification of the road work extension requires identification of road work extension data. The identification of the road work identification data comprises, in one example, two data points including identification of a start position of the at least one road work extension and identification of an end position of the at least one road work extension. The road work extension identification module 313 may determine the start of the road work extension using the location of the last learned speed sign of the validated speed funnel. However, regarding the end of the road work extension, two scenarios may arise owing to the candidate learned speed sign being found on one of the first map matched link or on the second link.

In one example, if the downstream link containing the candidate learned speed sign is the first map-matched link, a start offset associated with the candidate learned speed sign is greater than a start offset associated with the last learned speed sign. For example, the distance from the location of capturing of the last learned speed sign to the actual location of the last learned speed sign is smaller than the distance from the location of capturing of the candidate learned speed sign value to the actual location of the candidate learned speed sign. In such a scenario, road work extension identification module 313 may determine the end of the road work extension using the location of the candidate learned speed sign on the first map matched link.

In the other scenario, where the candidate learned speed sign is found on the second link (i.e. the downstream link is the second link), the road work extension identification module 313 may determine the end of the road work extension using the location of the candidate learned speed sign on the second link. In either scenario, it should be understood that the candidate learned speed sign is a road sign observation that comprises amongst other things, heading data and location data. Therefore, the end of the road work zone may be discerned based on the location data of the road sign observation constituting the candidate learned speed sign.

The road work extension identification module 313 may output the start and end of the road work zone as the road work extension data.

Returning to the process of searching in the one or more first links, the processor 303 may not find a suitable link that qualifies either as the first map-matched link or as the second link. Alternately, the processor 303 may not find a suitable sign that qualifies the speed value difference being within a non-negative threshold range criterion. In such scenarios, if the candidate learned speed sign is not determined, the process of searching may be terminated subject to a condition that the downstream link identification module 311 module determines a total length of the searched links among the one or more first links to be equal to the threshold distance, for example, 15 km. The length of each of the links may be obtained by the processor 303 from the map database 107.

The user interface module 315 may output the road work identification data to a user device such as the user equipment 101 of FIG. 2. In some example embodiments, the user interface module 315 may provide the road work identification data to the map database to update the map of the road on which the road work extension lies. Thus, a user requesting a route through such a road may be updated about the presence of the road work using the road work identification data. In an embodiment, the road work identification system 105 may assist in providing navigation suggestions to the user of the vehicle 201 to avoid the road work extension, which will be later explained in conjunction with FIG. 6.

The processor 303 may be embodied in a number of different ways. For example, the processor 303 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 303 may include one or more processing cores configured to perform independently. A multi-core processor may enable multiprocessing within a single physical package. Additionally or alternatively, the processor 303 may include one or more processors configured in tandem via the bus to enable independent execution of instructions, pipelining and/or multithreading.

Additionally or alternatively, the processor 303 may include one or processors capable of processing large volumes of workloads and operations to provide support for big data analysis. In an example embodiment, the processor 303 may be in communication with a memory 317 via a bus for passing information among components of the system 200. The memory 317 may be non-transitory and may include, for example, one or more volatile and/or non-volatile memories. In other words, for example, the memory 317 may be an electronic storage device (for example, a computer readable storage medium) comprising gates configured to store data (for example, bits) that may be retrievable by a machine (for example, a computing device like the processor 303). The memory 317 may be configured to store information, data, content, applications, instructions, or the like, for enabling the apparatus to carry out various functions in accordance with an example embodiment of the present invention. For example, the memory 317 could be configured to buffer input data for processing by the processor 303. As exemplarily illustrated in FIG. 3, the memory 317 could be configured to store instructions for execution by the processor 303. As such, whether configured by hardware or software methods, or by a combination thereof, the processor 303 may represent an entity (for example, physically embodied in circuitry) capable of performing operations according to an embodiment of the present invention while configured accordingly. Thus, for example, when the processor 303 is embodied as an ASIC, FPGA or the like, the processor 303 may be specifically configured hardware for conducting the operations described herein. Alternatively, as another example, when the processor 303 is embodied as an executor of software instructions, the instructions may specifically configure the processor 303 to perform the algorithms and/or operations described herein when the instructions are executed. However, in some cases, the processor 303 may be a processor specific device (for example, a mobile terminal or a fixed computing device) configured to employ an embodiment of the present invention by further configuration of the processor 303 by instructions for performing the algorithms and/or operations described herein. The processor 303 may include, among other things, a clock, an arithmetic logic unit (ALU) and logic gates configured to support operation of the processor 303.

In some embodiments, the processor 303 may be configured to provide Internet-of-Things (IoT) related capabilities to users of the system 200 disclosed herein. The IoT related capabilities may in turn be used to provide smart city solutions by providing real time parking updates, big data analysis, and sensor based data collection by using the cloud based road work identification system 105 for providing navigation and parking recommendation services and roadwork zone identification services. In some embodiments, the road work identification system 105 may be configured to provide an environment for development of parking strategy recommendation solutions for navigation systems in accordance with the embodiments disclosed herein. The environment may be accessed using the user interface module 315 of the road work identification system 105 disclosed herein. The user interface module 315 may provide an interface for accessing various features and data stored in the road work identification system 105. In some example embodiments, the processor 303 may be configured to execute a method for determining road work extension data for identification of at least one road work extension, that is discussed in conjunction with FIG. 4 as below.

FIG. 4A illustrates a flow diagram of a method 400 for determining road work extension data for identification of at least one road work extension, in accordance with an example embodiment of the present invention. The method 400 may be executed by a processor configured within the road work identification system 105 of FIG. 1 in the order of described below or an alternative order as long the method 400 fetches the same result in any order of execution. Alternatively, the processor 303 may be configured within any other server systems or smart devices to carry out the method 400.

At 401, the method comprises obtaining one or more speed funnels of at least one route of a geographical area. The one or more speed funnels may be obtained from one or more vehicles or from an OEM cloud associated with the one or more vehicles. Each of the one or more speed funnels includes at least two different learned speed signs. In one embodiment, the one or more speed funnels may be generated by the processor 303 within the system using the sensor data collected by a sensor unit (such as the sensor unit 207 of FIG. 1). At 403, the method includes validating at least one speed funnel from the one or more speed funnels. The validation involves identifying a last learned speed sign of each of the one or more speed funnels. The at least one speed funnel is validated if the speed value difference between the last learned speed sign and a map-matched speed of the link on which the last learned speed sign is located is greater than a threshold. The map-matched speed of the link may be defined as the speed limit of the link as recorded in the map database 107 of FIG. 1. If the difference between the last learned speed sign and a map-matched speed of the link is more than a pre-defined speed limit threshold, then the speed funnel is considered valid. In a preferred embodiment, the pre-defined speed limit threshold may be 19 km/h.

At 405, the method comprises searching in one or more first links in downstream of the last learned speed sign of the validated at least one speed funnel, to obtain a result. for the process of searching in one or more first links to obtain a result is described in a flow diagram in conjunction with FIG. 4B. FIG. 4B illustrates a flow diagram method for determining a downstream link, in accordance with an example embodiment of the present invention. The method 405 starts at 421, for searching in one or more first links in downstream of the last learned speed sign of the validated speed funnel. At 423, the method 405 involves executing a condition, where if the candidate speed sign is identified in the one or more first links that are in downstream of the last learned speed sign, then the method executes step 425. At 425, the method 405 includes identifying two data points including identification of a start position of the at least one road work extension based on the last learned speed sign on the first map-matched link and identification of an end position of the at least one road work extension as a location of the candidate learned speed sign on the downstream link. The candidate learned speed sign may be considered to be on a downstream link. The data points may be considered as the road work extension data at 407 in conjunction with FIG. 4A and FIG. 4B.

Alternatively, at 423, if the method 405 does not yield the candidate speed sign in the one or more first links, then the method 405 executes step 427. At 427, the method 405 comprises determining a total length of the one or more first links as a result. If the total length of the one or more first links is equal to a threshold distance (for example 15 km), the method 405 may end the searching. At 407, in accordance with FIG. 4A and FIG. 4B, the method 400 generates the road work extension data corresponding to the road work extension. In one example, determining the total length of one or more first links comprises identifying a start position of the at least one road work extension as a location of the last learned speed sign on the first map-matched link and identifying an end position of the at least one road work extension as a link end location of the downstream link, wherein the downstream link corresponds to end of the one or more links in the downstream of the last learned speed sign.

An example describing a road work extension located on a route or a pathway in association with a speed funnel is explained in FIG. 5.

FIG. 5 illustrates a schematic diagram 500 describing an exemplary embodiment showing road work extension 503 including a speed funnel 501 and a candidate learned speed sign 505, in accordance with an embodiment. The schematic diagram 500 shows a route or a pathway 507 on which road work is commenced. A system, method and a computer program product as disclosed in some example embodiments, is configured to identify the road work extension data of the road work extension 503 on the pathway 507. In one example, the road work extension may be identified and defined in the units of length. In another example, the pathway 507 may be constituted on one or more links (or first links).

In one example, a vehicle such as the vehicle 201 of FIG. 2 is configured to capture multiple speed sign observations of the speed signs (501A, 501B and 509) positioned on the pathway. The sensor data is processed by a processor such as the processor 303 of FIG. 1 and learned speed are generated based on the captured speed sign observations. Further, one or more speed funnels are generated such as the speed funnel 501 using at least two learned speed signs (501A, 501B and 509) by the processor 303. The processor 303 identifies a last learned speed sign 509 of the speed funnel 501. The speed funnel 501 is validated by comparing the sign value of the last learned speed sign with that of speed value associated with a map-matched link. The location data of the last learned speed sign 509 corresponds to a start of the road work extension 503 if the speed funnel 501 is validated. Further, a candidate learned speed sign 505 that satisfies the link criteria and the speed value criteria discussed previously may be identified. The location data of the candidate learned speed sign may correspond to an end of the road work extension 503.

FIG. 6 illustrates a schematic representation 600 of a user interface (UI) 205 of a user equipment 101 (such as that used in conjunction with the vehicle 201) representing at least one road work extension 603 in a geographic area 601, in accordance with an example embodiment. Accordingly, the UI 205 assists a user associated with the user equipment 101 with the notifications on the upcoming road work extensions 603 such as through navigation assistance data. The different representations of the navigation suggestions may be in the form of a map as shown in the UI 205 with color coded or patterned road links indicating road work extension 603 of a geographical area 601.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

We claim:

1. A method for determining road work extension data for identification of at least one road work extension, the method comprising:

obtaining one or more speed funnels, each including at least two different learned speed signs;

validating by a processor, at least one speed funnel from the one or more speed funnels, based on a calculated difference between a sign value of a last learned speed sign of each of the one or more speed funnels and a map-matched speed associated with the last learned speed sign;

searching by the processor, in one or more first links downstream of the last learned speed sign of the validated at least one speed funnel, to obtain a result, wherein the one or more first links includes a downstream link, wherein the result indicates one of:

determination of a candidate learned speed sign on the downstream link of the one or more first links; or a total length of the one or more first links is equal to a threshold distance, wherein the downstream link is one of a first map-matched link on which the last learned speed sign is positioned or a second link associated with the first map-matched link; and determining by the processor, the road work extension data associated with the at least one road work extension, based on the last learned speed sign and the result.

2. The method of claim 1, wherein a sign value difference between the candidate learned speed sign and the last learned speed sign is within a non-negative threshold range.

3. The method of claim 1, wherein the searching in the first one or more links further comprises determining the downstream link from the one or more first links.

4. The method of claim 3, wherein the determining of the downstream link from the one or more first links comprises:

determining one or more third links from the one or more first links based on a link criteria, and selecting the second link, from the determined one or more third links, as the downstream link, wherein a heading difference, between the second link and a link preceding the second link in the determined one or more third links, is within a threshold heading range.

5. The method of claim 4, wherein the link criteria includes:

a first criterion that an upstream node of each of the one or more third links is same as a downstream node of a corresponding link preceding each of the one or more third links;

a second criterion that a functional class of each of the one or more third links is same as a functional class of the corresponding link preceding each of the one or more third links;

a third criterion that a ramp indicator of each of the one or more third links is same as a ramp indicator of the corresponding link preceding each of the one or more third links; and a fourth criterion that a total length of the one or more third links is less than the threshold distance.

6. The method of claim 1, wherein the result indicates the determination of the candidate learned speed sign on the downstream link, and wherein the determining of the road work extension data further comprises:

identifying a start position of the at least one road work extension based on the last learned speed sign on the first map-matched link; and identifying an end position of the at least one road work extension as a location of the candidate learned speed sign on the downstream link.

7. The method of claim 6, wherein the downstream link is the first map-matched link, and wherein a start offset associated with the candidate learned speed sign is greater than a start offset associated with the last learned speed sign.

8. The method of claim 1, wherein the at least one speed funnel is validated based on determining that the calculated difference is greater than a threshold.

9. The method of claim 1, wherein the result indicates that the total length of the one or more links is equal to the threshold distance, and wherein the determining of the road extension data associated with the at least one road work extension comprises:

identifying a start position of the at least one road work extension as a location of the last learned speed sign on the first map-matched link, and identifying an end position of the at least one road work extension as a link end location of the downstream link, wherein the downstream link corresponds to end of the one or more links in the downstream of the last learned speed sign.

10. A system for determining road work extension data for identification of at least one road work extension, comprising:

at least one memory configured to store computer program code instructions; and at least one processor configured to execute the computer program code instructions to:

obtain one or more speed funnels, each including at least two different learned speed signs;

validate at least one speed funnel from the one or more speed funnels, based on a calculated difference between a sign value of a last learned speed sign of each of the one or more speed funnels and a map-matched speed associated with the last learned speed sign;

search in one or more first links in downstream of the last learned speed sign of the validated at least one speed funnel, to obtain a result, wherein the one or more first links includes a downstream link, wherein the result indicates one of:

determination of a candidate learned speed sign on the downstream link of the one or more first links; or a total length of the one or more first links is equal to a threshold distance, wherein the downstream link is one of a first map-matched link on which the last learned speed sign is positioned or a second link associated with the first map-matched link, and determine the road work extension data associated with the at least one road work extension based on the last learned speed sign and the result.

11. The system of claim 10, wherein a sign value difference between the candidate learned speed sign and the last learned speed sign is within a non-negative threshold range.

12. The system of claim 10, wherein to search in the first one or more links, the at least one processor is further configured to determine the downstream link from the one or more first links.

13. The system of claim 12, wherein the at least one processor is further configured to:

determine one or more third links from the one or more first links based on a link criteria, and select the second link, from the determined one or more third links, as the downstream link, wherein a heading difference, between the second link and a link preceding the second link in the determined one or more third links, is within a threshold heading range.

14. The system of claim 13, wherein the link criteria includes:
- a first criterion that an upstream node of each of the one or more third links is same as a downstream node of a corresponding link preceding each of the one or more third links;
- a second criterion that a functional class of each of the one or more third links is same as a functional class of the corresponding link preceding each of the one or more third links;
- a third criterion that a ramp indicator of each of the one or more third links is same as a ramp indicator of the corresponding link preceding each of the one or more third links; and
- a fourth criterion that a total length of the one or more third links is less than the threshold distance.

15. The system of claim 10,
wherein the result indicates the determination of the candidate learned speed sign on the downstream link, and
wherein the at least one processor is further configured to:
identify a start position of the at least one road work extension based on the last learned speed sign on the first map-matched link; and
identify an end position of the at least one road work extension as a location of the candidate learned speed sign on the downstream link.

16. The system of claim 15,
wherein the downstream link is the first map-matched link, and
wherein a start offset associated with the candidate learned speed sign is greater than a start offset associated with the last learned speed sign.

17. The system of claim 10, wherein the at least one processor is further configured to validate the at least one speed funnel based on determining that the calculated difference is greater than a threshold.

18. The system of claim 10, wherein the at least one processor is further configured to:
wherein the result indicates that the total length of the one or more links is equal to the threshold distance, and
wherein the at least one processor is further configured to:
identify a start position of the at least one road work extension as a location of the last learned speed sign on the first map-matched link, and
identify an end position of the at least one road work extension as a link end location of the downstream link,
wherein the downstream link corresponds to end of the one or more links in the downstream of the last learned speed sign.

19. A computer program product comprising at least one non-transitory computer-readable storage medium having stored thereon computer-executable program code instructions which when executed by a computer, cause the computer to carry out operations for determining road work extension data for identification of at least one road work extension, the operations comprising:
obtaining one or more speed funnels, each including at least two different learned speed signs;
validating, by a processor, at least one speed funnel from the one or more speed funnels, based on a calculated difference between a sign value of a last learned speed sign of each of the one or more speed funnels and a map-matched speed associated with the last learned speed sign;
searching by the processor, in one or more first links in downstream of the last learned speed sign of the validated at least one speed funnel to obtain a result,
wherein the one or more first links includes a downstream link, and
wherein the result indicates one of:
determination of a candidate learned speed sign on the downstream link of the one or more first links; or
a total length of the one or more first links is equal to a threshold distance,
wherein the downstream link is one of a first map-matched link on which the last learned speed sign is positioned, or a second link associated with the first map-matched link, and
determining the road work extension data associated with the at least one road work extension, based on the last learned speed sign and the result.

20. The computer program product of claim 19, wherein a sign value difference between the candidate learned speed sign and the last learned speed sign is within a non-negative threshold range.

* * * * *